Nov. 26, 1935.  J. H. VICTOR ET AL  2,022,304
GREASE RETAINER
Filed Feb. 13, 1933
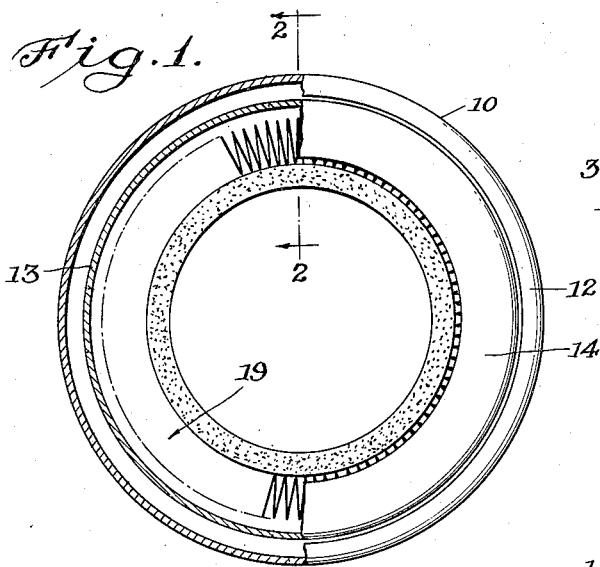
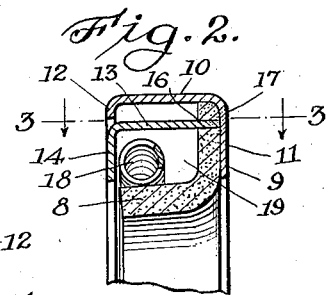
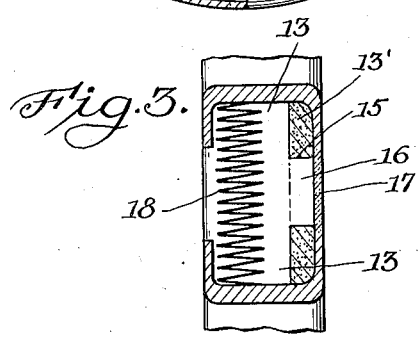
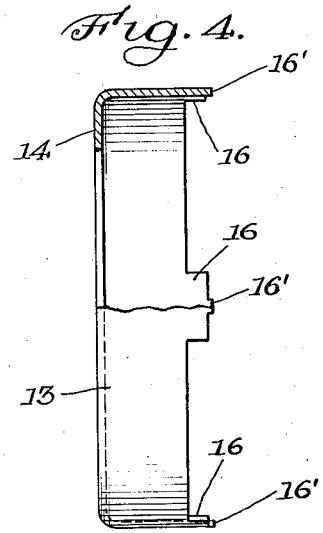
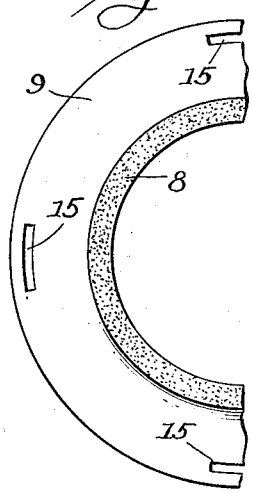
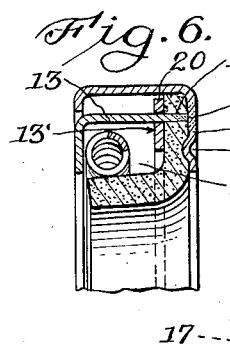
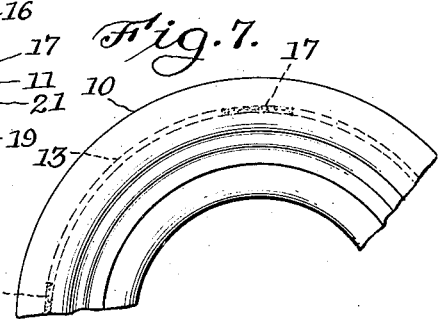
INVENTOR
John H. Victor and
BY William A. Heinze
Wm. O. Bell
ATTORNEY Patented Nov. 26, 1935

2,022,304

UNITED STATES PATENT OFFICE 2,022,304

GREASE RETAINER

John H. Victor, Evanston, and William A. Heinze, Chicago, Ill., assignors to Victor Manufacturing & Gasket Company, Chicago, Ill., a corporation of Illinois Application February 13, 1933, Serial No. 656,461

4 Claims. (Cl. 288—1)

This invention relates to grease retainers of the kind which are employed to form a seal about the rear axle of an automobile and for many other purposes where it is desired to prevent the escape of grease or oil.

The object of the invention is to provide a unitary device of novel and simple construction adapted to be readily installed for use and which will effectively prevent the escape of grease or oil thereby.

Another object of the invention is to provide a novel and effective means for securing the packing in a unit grease retainer and for preventing the passage of grease or oil around the packing within the retainer.

And a further object of the invention is to provide a grease retainer having a double shell construction, one shell being arranged concentrically within the other, and providing a strong and substantial device capable of resisting severe blows without being distorted.

In the accompanying drawing illustrating a selected embodiment of the invention, Fig. 1 is a side view of the retainer partly in section.

Fig. 2 is a detail transverse sectional view on the line 2—2 of Fig. 1.

Fig. 3 is a sectional view on the line 3—3 of Fig. 2.

Fig. 4 is a detail view of the inner shell partly broken away and in section.

Fig. 5 is a detail plan view of a portion of the packing.

Fig. 6 is a sectional view corresponding with Fig. 2 and showing another form of the invention.

Fig. 7 is a detail view showing one side of a part of the retainer.

Referring to the drawing, the packing preferably comprises a ring made of leather or other suitable material having a tubular portion 8 to engage a shaft and a radial portion 9 which is securely held against rotation in the device. The outer shell, formed from sheet metal, comprises a rim 10 and a side 11 integral with one edge of the rim, and the radial portion of the packing is arranged within the shell against the inner face of the side and abutting the inner face of the rim. The other edge of the rim is preferably turned inward to form a flange 12. The inner shell is also formed from sheet metal and comprises a rim 13 and a side 14 integral with one edge of the rim. The side 14 of the inner shell is located opposite the side 11 of the outer shell and forms, with the flange 12, one side of the device. The inner shell is arranged within the outer shell with its rim 13 spaced a distance from the outer shell to permit parts of the inner shell to pass through the openings in the radial portion of the packing. Slots 15 are provided in the radial portion 9 of the packing at spaced intervals and the rim of the inner shell is provided with projections 16 which extend through said slots and abut the side 11 of the outer shell. The projections 16 and the side 11 are welded together and the projections are preferably provided initially with welding tips 16' to facilitate the welding operation. The projections 16 abut the side 11 of the outer shell and the welds 17 secure the inner shell rigidly to the outer shell. The edges 13' of the inner rim 13 between the projections 16 engage the packing and hold it tightly against the outer shell. A resilient ring preferably in the form of a coil spring 18 is arranged in the spring chamber 19 between the packing and the inner shell and operates to hold the tubular portion of the packing in close contact with the shaft upon which the retainer is mounted.

The inner shell clamps the radial portion of the packing tightly against the side 11 of the outer shell and thereby prevents the passage of grease or oil about the peripheral edge of the packing and we may employ a washer 20, Fig. 6, between the edge of the inner shell and the packing to provide a more effective seal, if desired. The side 11 of the outer shell may be provided with an annular indenture 21 to compress the annular portion of the packing between itself and the washer.

The invention provides a retainer of strong and substantial construction which will withstand without distortion the blows ordinarily employed for installing the retainer in a housing. The shells are welded together and the packing is rigidly secured in place between the shells against relative rotative movement and with sufficient contact area between the packing and the shells to prevent passage of grease or oil about the peripheral edge of the radial portion of the packing. The packing contacts the entire inner face of the side 11 of the outer shell and with a portion of the rim of the outer shell and with the inner edge of the inner shell, with or without the washer 20. Since the inner shell is welded securely to the outer shell and the projections 16 on the inner shell extend through openings in the packing, the latter is prevented from rotative movement relative to the shells and the parts are preferably so proportioned that the inner shell will tightly clamp the radial portion of the packing between itself and the outer shell to prevent relative movement of the packing and shells and also to prevent the passage of grease or oil.

We do not limit the invention to the specific disclosure in the foregoing description and drawing but reserve the right to make any changes in the form, construction and arrangement of parts as may be necessary or desirable for the many purposes for which grease retainers are employed and within the scope of the following claims.

We claim:

1. A grease retainer comprising an outer shell having a rim and one side, an inner shell having a rim and one side, the rim of the inner shell being spaced from the rim of the outer shell and the side on the inner shell being disposed opposite to the side on the outer shell, a packing secured within the shells and projections on the inner shell penetrating the packing and contacting the outer shell and secured to the outer shell.

2. A grease retainer comprising an outer shell having a rim and one side, an inner shell having a rim and one side, the rim of the inner shell being spaced from the rim of the outer shell and the side on the inner shell being disposed opposite to the side on the outer shell, the inner edge of the rim of the inner shell being spaced from the side of the outer shell, projections on the inner edge of the rim of the inner shell abutting and welded to the side of the outer shell, and a packing having openings to receive said projections and secured between the side of the outer shell and the rim of the inner shell.

3. A grease retainer comprising an outer shell having a rim and one side, an inner shell having a rim and one side, the rim of the inner shell being spaced from the rim of the outer shell and the side on the inner shell being disposed opposite to the side on the outer shell, a packing arranged between the side on the outer shell and the inner edge of the inner shell and having spaced openings therein, projections from the inner edge of the inner shell extending through said openings and welded to the side of the outer shell, and a washer interposed between the packing and the inner edge of the rim of the inner shell and having openings to receive the projections on the inner shell.

4. A grease retainer comprising an outer shell having a rim and one side, an inner shell having a rim and one side, the rim of the inner shell being spaced from the rim of the outer shell and the side on the inner shell being disposed opposite to the side on the outer shell, a packing having a tubular portion and also having a radially extending portion secured between the side on the outer shell and the inner edge of the rim of the inner shell, a washer contacting the packing and adjacent the rim of the inner shell, said washer and packing having aligned openings therein and projections on the inner shell passing through said openings, the inner shell forming with the packing a spring chamber, and a spring arranged within said chamber and embracing the tubular portion of the packing.

JOHN H. VICTOR.
WILLIAM A. HEINZE.